United States Patent [19]
Takeuchi et al.

[11] Patent Number: 5,978,098
[45] Date of Patent: Nov. 2, 1999

[54] IMAGE COMPRESSION METHOD

[75] Inventors: Noriko Takeuchi; Yukihiro Nishida, both of Fukuoka; Seiichiro Hiratsuka, Kitakyushu, all of Japan

[73] Assignee: Matsushita Electric Industrial Co., Ltd., Osaka, Japan

[21] Appl. No.: 08/829,304

[22] Filed: Mar. 31, 1997

[30] Foreign Application Priority Data

Apr. 5, 1996 [JP] Japan ................................. 8-083692

[51] Int. Cl.$^6$ .............................. G06K 9/36; G06K 9/46
[52] U.S. Cl. ........................................... 358/433; 382/272
[58] Field of Search ..................................... 358/433, 521; 382/232, 237, 251, 272; 348/420, 421

[56] References Cited

U.S. PATENT DOCUMENTS 4,409,623  10/1983  Kobayashi et al. ..................... 358/433

Primary Examiner—Phuoc Tran
Attorney, Agent, or Firm—Stevens, Davis, Miller & Mosher, L.L.P.

[57] ABSTRACT

An image compression method for encoding gradation image data for use in, for example, a printer or a copying machine handling the gradation image. When a difference between two representative values in one block E)f the image data is less than a predetermined amount, a block code made up of a single piece of gradation data and one pixel array pattern is generated. When the difference is not less than the predetermined amount, the representative values are replaced by any of sixteen substitute values, and a block code is formed to include two gray scale data each of four bits and a single pixel array pattern, thereby realizing coding compression of the image information.

7 Claims, 6 Drawing Sheets

FIG. 5A
PRIOR ART
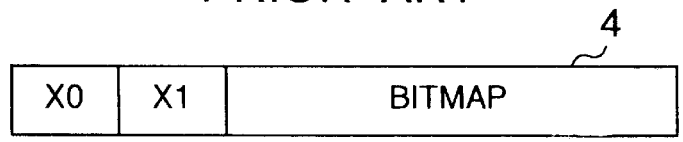
FIG. 5B
PRIOR ART
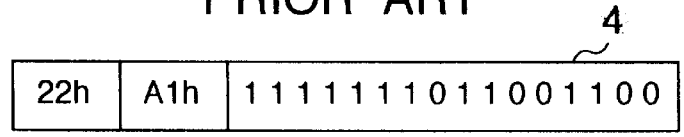
FIG. 6
PRIOR ART
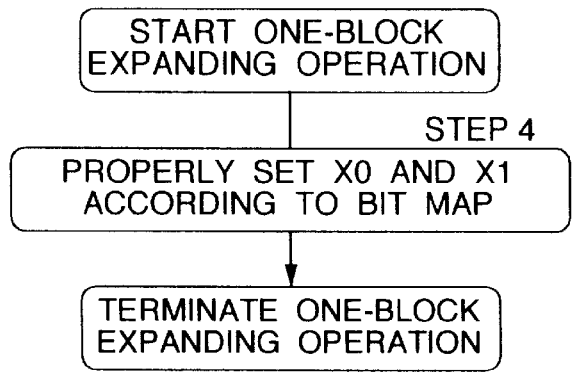
FIG. 7
PRIOR ART
| 161 | 161 | 161 | 161 |
|-----|-----|-----|-----|
| 161 | 161 | 161 | 34  |
| 161 | 161 | 34  | 34  |
| 161 | 161 | 34  | 34  |

IMAGE COMPRESSION METHOD

BACKGROUND OF THE INVENTION

1. Field of the Invention

The present invention relates to a method for compressing an image having a multiplicity of levels of gradations for use in a printers a copying machine or the like.

2. Description of the Related Art

In recent years, a market for output devices such as printers, copying machines and so on has been growing significantly. These devices have been required to have a high quality of output and needs for their color image output has been recently increased. To this end, the data processing performed by such devices inevitably involves an increase in the necessary capacity of memory and thus it becomes expensive. Meanwhile, in the current situations, less price competition of such devices per se has been accelerated. For the purpose of realizing a high quality of output with less price, it is necessary to reduce the necessary capacity of memory based on the compression technique of image data.

Conventional methods for compressing information on a gray-scale image include a technique called block approximation coding. This method will be explained by referring to FIGS. 1 to 7.

FIG. 1 shows a partly enlarged image, in which reference numeral 1 denotes a picture element or pixel as a minimum unit of the image. It is assumed in this case that one pixel is made up of 8 bit data indicative of 256 gradations having values of 0 to 256. Adjacent pixels in a 4×4 array (a total of 16 pixels) form a block 2. Data processing is carried out on a block basis.

FIG. 2 shows a practical example of the block 2, and FIG. 3 shows a procedure when the block 2 is subjected to a block approximation coding. Firsts an average value X of the pixels of the block 2 (in-block average value) to be subjected to the block approximation coding is found (step 1). In the examples the in-block average value X of FIG. 2 is 121.9.

Then the in-block average value is compared with the respective values of the pixels in the block 2 to divide the pixels into a group in which pixels have values smaller than the in-block average value and a group in which pixels have values larger than the in-block average value (step 2). The pixels belonging to a group having a value less than the in-block average value are set to be represented by "0", and the pixels belonging to a group having a value not less than the in-block average value are set to be represented by "1" to thereby form a pixel array pattern. A pixel array pattern (bit map data) corresponding to the block 2 of FIG. 2 is shown in FIG. 4.

Next, an average value X0 of the values of the pixels represented by "0" in the pixel array pattern and an average value X1 of the values of the pixels represented by "1" in the pixel array pattern are calculated respectively to be used as representative values of the block (step 3). In the case of the block 2 of FIG. 2, the representative values X0 and X1 of the block are 34 (22 h) and 161 (a1 h) respectively. A final block code 4 of the block 2 is made up of 2 representative values of each 8 bits and a single pixel array pattern of 16 bits as shown in FIG. 5A, which specific example is as shown in FIG. 5B.

Shown in FIG. 6 is an expanding procedure of restoring the block code 4 to practical image data. More in detail, such operations (step 4) that the block representative value X0 in the block code 4 of FIG. 5A or 5B is applied to the pixels represented by "0" while the block representative value X1 thereof is applied to the pixels represented by "1" are carried out for all the pixels within the block. An image is obtained as a result of expanding the block code 4 of FIG. 5A or 5B.

In general, when one pixel is represented by q bit data and one block has N pixels, the quantity of data on one of blocks of an original image is q×N bits and image data after block coding is 2q+N bits corresponding to a sum of N bits of pixel array pattern and 2×q bits of block representative values.

Accordingly, a compression ratio of the image data based on the block coding is qN/(2q+N). In the example of FIG. 2, its compression ratio becomes 4 because one pixel is represented by 8 bits and one block has 16 bits.

However, a higher compression ratio has been demanded. It is an object of the present invention to provide an image compression system which enables data transmission with a memory smaller in capacity than a memory necessary for a prior art block approximation coding.

SUMMARY OF THE INVENTION

In accordance with a method of the present inventions average values of pixel data in a block are replaced by substitute values and the number of gradations for the substitute values are reduced to form encoded data. When a difference between two average pixel levels is small, a data code including an average value of all pixels in the block and a pixel array pattern having bits which are all "1" is generated to enhance a compression ratio.

By the above method, image data can be compressed with a high compression ratio.

BRIEF DESCRIPTION OF THE DRAWINGS

FIGS. 5A and 5B each shows a structure of a block code in the prior art image compression method;

FIG. 6 is a flowchart for explaining expanding operation in the prior art image compression method;

FIG. 7 shows image data after expanding operation in the prior art image compression method;

DESCRIPTION OF THE PREFERRED EMBODIMENTS

Figures 1, 2:
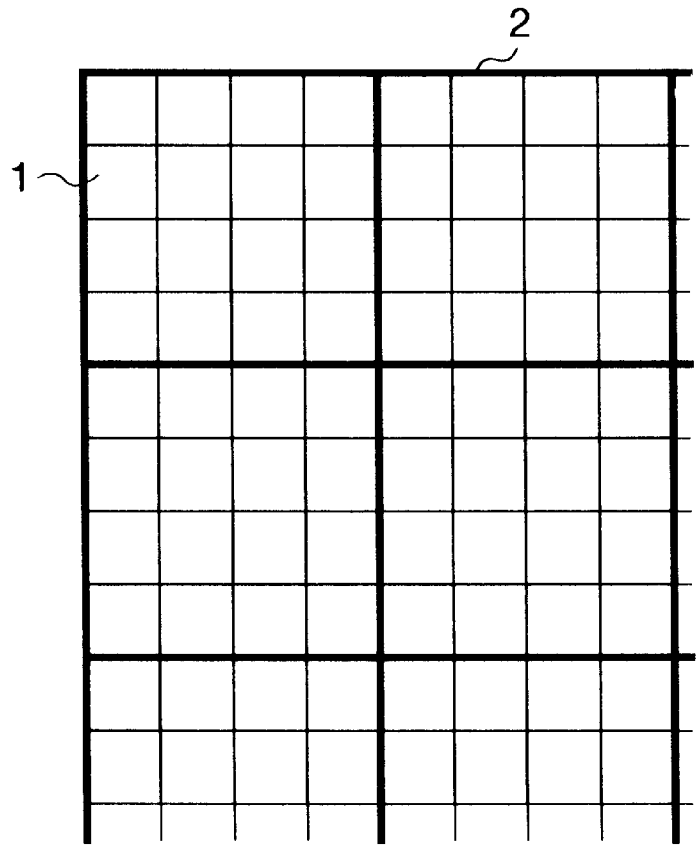
FIG. 1 shows some blocks of an image each consisting of a plurality of pixels.
FIG. 2 shows an example of image data prior to a compressing operation.
Figures 3, 4:
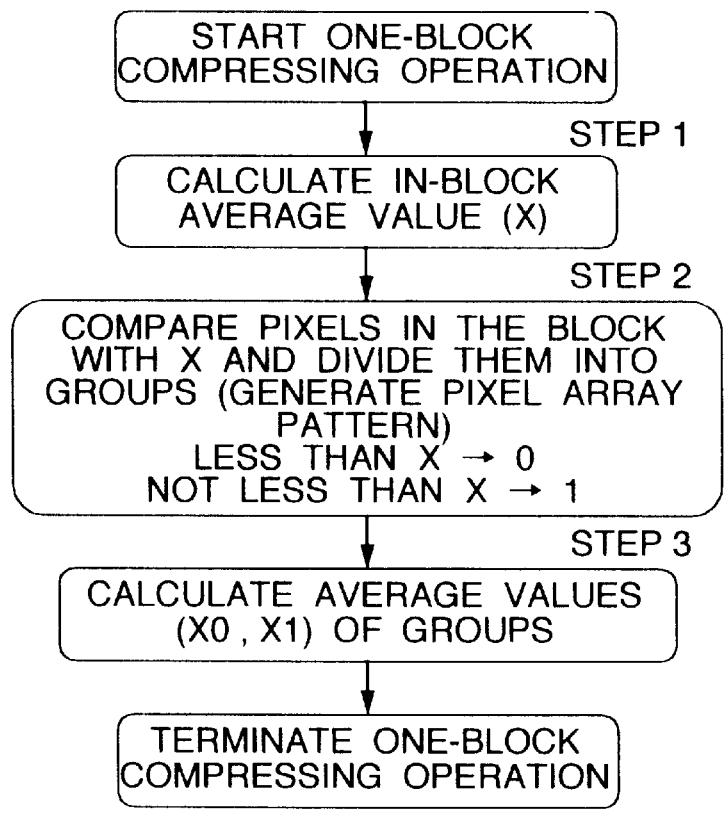
FIG. 3 is a flowchart for explaining a prior art image compression method.
FIG. 4 shows bit map data in the prior art image compression method.

Explanation will now be made as to an embodiment of the present invention with reference to FIGS. 1 and 2 and FIGS. 8 to 12. FIG. 1 shows an original image as enlarged for explaining coding compression of the present inventions.

In FIG. 1, reference numeral 1 denotes a pixel which is a minimum unit of an images Assume herein that each color data comprises 8 bits to handle 256 gradations and one pixel 1 has one of values of 0 to 255. As illustrated, a block 2 is made up of adjacent pixels 1 of a 4×4 array (a total of 16 pixels).

Figure 8:
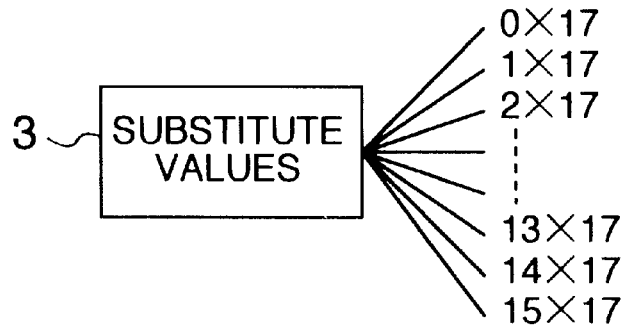
FIGS. 8 shows 16 substitute values in an image compression method in an embodiment of the present invention.
Figure 9:
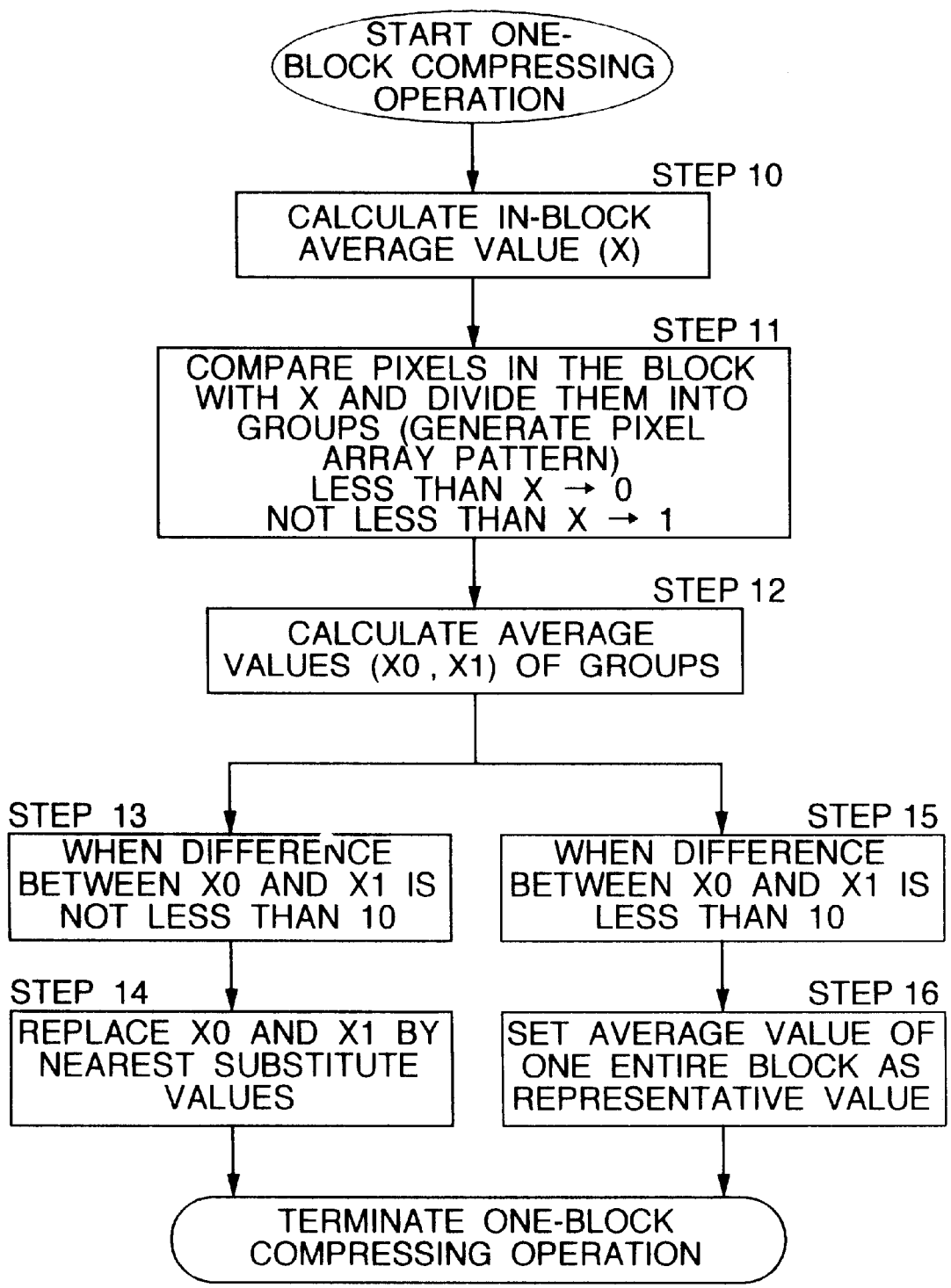
FIG. 9 is a flowchart for explaining the image compression method in the embodiment of the present invention.

FIG. 8 shows a relationship in which values of 0 to 255 are represented bit multiples of 17 and 16 substitute values 3 are set: for use in the present invention Explanation will next be made as to each of the steps in an image compression system of the present embodiment by referring to FIG. 9. First of all, an average value X of pixels of the block 2 (in-block average value) to be subjected to a block coding operation is found (step 10). Subsequently, the in-block average value is compared with each of the values of the pixels of the block 2 to divide the pixels into a first group in which each pixel has a value less than the in-block average value and a second group in which each pixel has a value not less than the in-block average value (step 11). Now, an average value X0 of the values of the pixels belonging to the first group as well as an average value X1 of the values of the pixels belonging to the second group (step 12). The subsequent operation will be branched depending on whether a difference between the average values X0 and X1 is less than 10 or not less than 10. In this connection, when the average values X0 and X1 are found as integers, the above branching may be carried out depending on whether the difference is (i) 9 or less or (ii) 10 or more, or on whether the difference is (i) 10 or less or (ii) 11 or more.

Explanation will be made in connection with a case where the difference between the average values X0 and X1 is not less than 10 (step 13), by referring to FIGS. 2, 4, 9, 10A and 10B. The in-block average value X of FIG. 2 is 121.9. As in the prior art image compression method, the pixels belonging to a group having a value less than the in-block average value are set to be represented by "0" and the pixels belonging to a group having a value not less than the in-block average value are set to be represented by "1" to thereby form a pixel array pattern (refer to FIG. 4).

Next, an average value X0 of the values of the pixels represented by "0" in the pixel array pattern and an average value X1 of the values of the pixels represented by "1" in the pixel array pattern are calculated respectively to be used as representative values of the block. In the case of the block 2 of FIG. 2, the representative values X0 and X1 of the block are 34 and 161 respectively.

Each representative value is replaced by one of 16 numbers corresponding to multiples of 17 as the substitute value 3. In this cases a substitute value Xa0 for the representative value X0 is 2×17 (34) and a substitute value Xa1 for the representative value X1 is 9×17 (153). These substitute values are further replaced by substitute values corresponding to the 17-multiple values divided by 17 (step 14). In this cases a substitute value Xb0 for the substitute value Xa0 is 2 and a substitute value Xb1 for the substitute value Xa1 is 9.

Figure 10A:
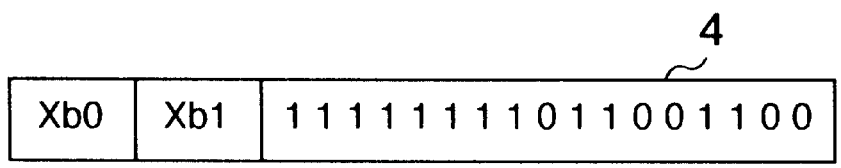
FIGS. 10A to 10C show structures of block codes in the embodiment of the present invention.
Figure 10B:
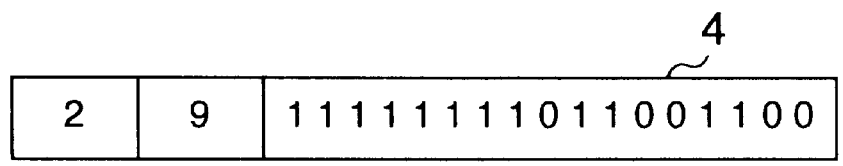

A final block code 4 of the block 2 is made up of two representative values Xb0 and Xb1 of each 4 bits and a single pixel array pattern of 16 bits (refer to FIG. 10A), which specific example is as shown in FIG. 10B.

Figure 10C:
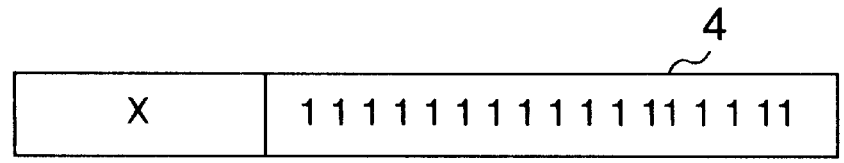

Meanwhile, when a difference between the representative values X0 and X1 of the respective groups is less than 10 (step 15), the average value X of the entire block 2 is used as a representative value of the block 2 (step 16). In this case, the final block code 4 of the block 2 is made up of a single representative value of 8 bits and a single pixel array pattern of 16 bits, which specific example is as shown in FIG. 10C.

Through the above operations, gradation information of larger- and smaller-value groups of the block 2 as well as bit map data are prepared, at which stage the generation of the block code 4 is completed and the compressing operation of one block ends.

Figures 11, 12:
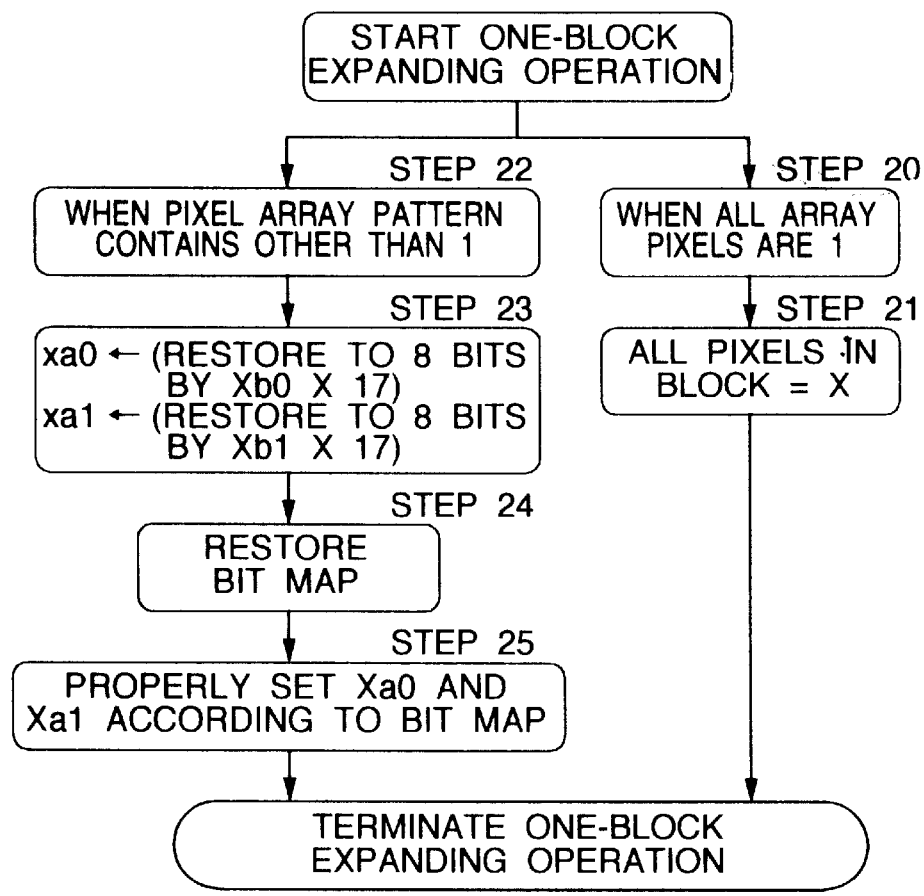
FIG. 11 is a flowchart for explaining expanding operation in the image compression method of the embodiment of the present invention.
FIG. 12 shows image data after the expanding operation of the image compression method of the embodiment of the present invention.

Explanation will next be made as to how to expand the block code 4. FIG. 11 shows a procedure of expanding the block code 4 corresponding one block for restoration or reconstruction of its actual original image.

First of all, the operation is branched depending on whether the bits of the pixel array pattern in the block code have values of all "1" or not. When the bits of the pixel array pattern are all "1" (step 20), the system judges that all the pixels of the block 2 have an identical value, and sets the block average value X given in the block code 4 of FIG. 10C as the gradation information for all of the pixels of the block 2 (step 21), and terminates its operation.

When the pixels of the pixel array pattern are all not "1" (step 22), the system judges that the block in question includes larger- and smaller-value groups and the gradation information in the block code 4 represents the substitute values corresponding to replacements of the average values of the groups.

The system restores the substitute values Xa0 and Xa1 included in the 16 numeric values, which are previously sets by multiplying the substitute values Xb0 and Xb1 by 17 for the pixels represented by "0" and "1" in the pixel array pattern respectively (step 23), restores the bit map (step 24), sets the substitute values Xa0 and Xa1 for the pixels of the block according to the bit map (step 25), and then terminates its operation. An expanded image of the block code 4 of FIG. 10B is shown in FIG. 12.

In general, when one pixel is represented by q bit data and one block has N pixels, the quantity of data on one of blocks of an original image is q×N bits and image data after block coding is 2×½q+N=(q +N) bits corresponding to a sum of N bits of pixel array pattern and 2×½q bits of representative values.

Accordingly, a compression ratio of the image data based on the block coding is qN/(q+N). In the present embodiments its compression ratio becomes 5.3 because one pixel is represented by 8 bits and one block has 16 bits.

In accordance with the image compression method of the present invention, the quantity of image data information can be reduced by decreasing the number of gradations for the two substitute values in the block coding, so that, when the difference between the two substitute values in gradation level is small, there can be a high compression ratio with less missing information by using the average value of the entire block.

We claim:

1. An image compression method comprising:
   (a) forming a block including a plurality of pixels in a multiple gradation image represented by a number of gradation levels; and
   (b) generating a block code including gradation information of said block and a pixel array pattern of said block to reduce a quantity of image information,
   wherein the block code is generated by making a number of gradation levels for representing the gradation information smaller than said number of gradation levels used for representing said multiple gradation image.

2. An image compression method according to claim 1, wherein:

step (b) includes obtaining two gradation values for said gradation information; and said method further comprises generating, when a difference between said two gradation values is smaller than a predetermined value, a block code including gradation information represented by one gradation value, and setting the number of gradation levels for representing the gradation information to be the same as said number of gradation levels used for representing said multiple gradation image.

3. An image compression method comprising:
(a) forming a block including a plurality of pixels in a multiple gradation image having gradation values represented in a first number of gradation levels;
(b) comparing a gradation value of each of said plurality of pixels with a threshold gradation value;
(c) dividing said block into a plurality of groups in accordance with comparison results of step (b);
(d) calculating an average of gradation values of pixels in each of said plurality of groups to obtain respective average gradation values of said plurality of groups; and
(e) generating, in a case where at least one of said average gradation values of said plurality of groups is not within a predetermined range, a block code including (i) group gradation values each of which represents one of said average gradation values of a respective one of said plurality of groups by using one of a second number of gradation levels, said second number of gradation levels being smaller than said first number of gradation levels used for representing said multiple gradation image, and (ii) a pixel array pattern of said block.

4. An image compression method according to claim 3, further comprising obtaining said threshold gradation value by calculating an average of the gradation values of said plurality of pixels in said block.

5. An image compression method according to claim 3, wherein step (c) includes dividing said block into two groups.

6. An image compression method according to claim 3, further comprising:
(e) generating, in a case where all of the average gradation values of said plurality of groups are within the predetermined range, a block code including (i) a block gradation value which represents the average gradation value of all pixels in said block and (ii) a pixel array pattern of said block.

7. An image compression method according to claim 6, wherein said block gradation value is represented by using one of said first number of gradation levels.

* * * * *